G. J. GAGNE.
SPEED INDICATING MEANS FOR MOTOR CYCLES.
APPLICATION FILED OCT. 9, 1913.
1,138,208.
Patented May 4, 1915.
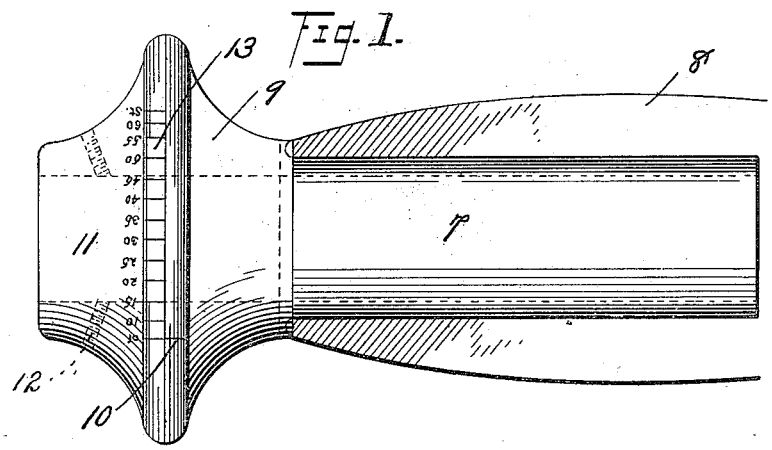
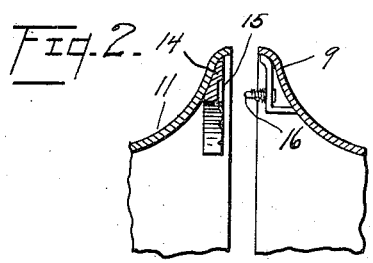
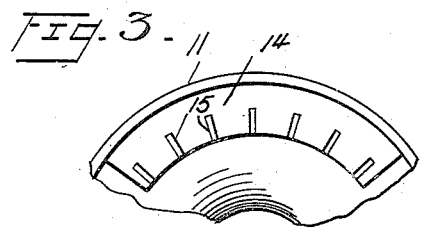
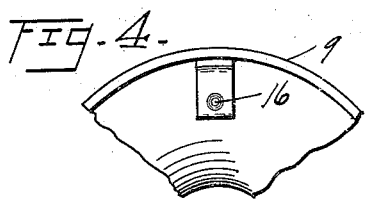

UNITED STATES PATENT OFFICE.

GEORGE J. GAGNE, OF WOONSOCKET, RHODE ISLAND.

SPEED-INDICATING MEANS FOR MOTOR-CYCLES.

1,138,208.        Specification of Letters Patent.        Patented May 4, 1915.

Application filed October 9, 1913. Serial No. 794,269.

*To all whom it may concern:*

Be it known that I, GEORGE J. GAGNE, citizen of the United States, residing at Woonsocket, in the county of Providence and State of Rhode Island, have invented new and useful Improvements in Speed-Indicating Means for Motor-Cycles, of which the following is a specification.

My present invention pertains to speed-indicating means for motor vehicles.

The object of the invention is to provide means in a motor cycle whereby the rider can accurately position the revoluble gas and spark-controlling hand-grasps of a motor cycle, and in that way predetermine and indicate the speed to be made, thus rendering a speedometer unnecessary and enabling a cyclist to intelligently meet the requirements of speed laws.

With the foregoing in mind the invention will be fully understood from the following description and claim when the same are read in connection with the drawings, accompanying and forming part of this specification, in which:

Figure 1 is a view, partly in plan and partly in section, showing one of the handle-bars of the cycle; it being understood that the other handle bar is identical with the one shown with the exception that its scale is reversely arranged—*i. e.*, its numerals increase from right to left instead of from left to right as in Fig. 1. Figs. 2, 3 and 4 are detail sections of the same.

Similar numerals of reference designate corresponding parts in all of the views of the drawings.

In furtherance of my invention the left-hand handle bar shown in Fig. 1 and the right-hand handle bar (not shown) respectively comprise a bar 7, a hand-grip 8 revoluble about its axis on the bar 7 and fixed with respect to a member 9 having a pointer-mark 10, and a member 11 opposed to the member 9 and adjustably fixed, by set screws 12 or other means to the bar 7, and having a scale 13 on its portion that is opposed to the member 9; the said scale being preferably though not necessarily numbered from 10 to 60, as shown.

It is to be understood that the two-hand grips 8 are connected in the ordinary, well-known manner to adapt them for use in operating the gas and spark control of the cycle. These connection features, however, form no part of my present invention and I have therefore deemed it unnecessary to illustrate the same.

The operation is as follows: In the event of the rider of the cycle deciding that he would like to travel at a certain rate of speed for a certain time or for the distance between two points, he turns the handle-grips 8 of the handle-bars to carry their indicating points 10 to the proper graduations of the scales 13 on the members 11. With the hand-grasps 8 properly set, the cycle will under favorable road conditions attain and maintain the desired predetermined speed.

It will be gathered from the foregoing that when a cycle is equipped with my improvement and the parts are properly positioned or adjusted the rider is apprised of the speed the machine is making and is cognizant of the fact that the desired speed will not be exceeded. This enables the rider to avoid breaking the speed laws. It will also be gathered that the controlling parts described are free to be operated irrespective of my improvement and that therefore the operation of the motor cycle is not limited in its operation by my improvement.

A rack 14 fixed in member 11 and having spaced seats 15 is designed to coöperate with a spring-pressed pawl 16 carried in member 9, Figs. 2 to 4, to enable the operator to regulate the device by the sense of feeling; it being understood that said seats are properly arranged relative to the graduations of scale 13.

It will be readily observed that the member 9 is larger in diameter than the hand grasp 8. This is materially advantageous since it enables the member 9 to serve as a guard, calculated to prevent slipping of the hand of the rider off the hand-grasp.

Having described my invention, what I claim and desire to secure by Letters-Patent, is:

The combination of a motor cycle handle-bar, a hand-grasp revoluble about the bar and adapted for fuel or spark control, a member, larger in diameter than the hand-grasp, fixed to the rear or outer end portion of the hand grasp, and a member secured on the handle-bar in rear of the first-named member and opposed to and abutting against the same; one of the said member having a scale and the other member having a pointer adapted to coöperate with said scale.

In testimony whereof I have hereunto set my hand in presence of two subscribing witnesses.

GEORGE J. GAGNE.

Witnesses:
 EDGAR L. SPAULDING,
 EVELYN W. SPAULDING.

Copies of this patent may be obtained for five cents each, by addressing the "Commissioner of Patents, Washington, D. C."